United States Patent
Barker, Jr. et al.

(10) Patent No.: US 8,514,861 B2
(45) Date of Patent: Aug. 20, 2013

(54) APPARATUS AND METHOD FOR MULTICASTING DATA IN A COMMUNICATION NETWORK

(75) Inventors: Charles R. Barker, Jr., Orlando, FL (US); Avinash Joshi, Orlando, FL (US)

(73) Assignee: MeshNetworks, Inc., Maitland, FL (US)

( * ) Notice: Subject to any disclaimer, the term of this patent is extended or adjusted under 35 U.S.C. 154(b) by 942 days.

(21) Appl. No.: 11/324,483

(22) Filed: Jan. 3, 2006

(65) Prior Publication Data

US 2007/0153789 A1 Jul. 5, 2007

(51) Int. Cl.
*H04L 12/56* (2011.01)
(52) U.S. Cl.
USPC .......................................................... 370/390
(58) Field of Classification Search
USPC ....................................... 370/230, 230.1, 390
See application file for complete search history.

(56) References Cited

U.S. PATENT DOCUMENTS

| | | | |
|---|---|---|---|
| 5,175,765 A * | 12/1992 | Perlman | 380/30 |
| 5,519,704 A * | 5/1996 | Farinacci et al. | 370/402 |
| 6,131,123 A | 10/2000 | Hurst et al. | |
| 7,068,600 B2 * | 6/2006 | Cain | 370/230.1 |
| 7,372,853 B2 * | 5/2008 | Sharma et al. | 370/390 |
| 7,423,973 B2 * | 9/2008 | Chen et al. | 370/238 |
| 2002/0186652 A1 | 12/2002 | Popovich | |
| 2003/0227934 A1 | 12/2003 | White et al. | |
| 2004/0066759 A1 * | 4/2004 | Molteni et al. | 370/329 |
| 2004/0202120 A1 | 10/2004 | Hanson | |
| 2005/0036487 A1 * | 2/2005 | Srikrishna | 370/389 |
| 2005/0037757 A1 | 2/2005 | Moon et al. | |
| 2005/0175009 A1 | 8/2005 | Bauer | |
| 2008/0137540 A1 * | 6/2008 | Botvich | 370/241 |

FOREIGN PATENT DOCUMENTS

GB 2379358 A 5/2002

OTHER PUBLICATIONS

PCT/US06/62383, PCT Search Report and Written Opinion, mailed Sep. 25, 2007, 8 pages.
PCT/US2006/062383, PCT Preliminary Report on Patentability, mailed Jul. 17, 2008, 6 pages.
Korean IP Office (KIPO) Notice of Preliminary Rejection (Translation)—May 2010—4 pages.
German Application No. 112006 003 603.3-31—Translation—Rejection dated Feb. 2011—3 pages.
Korean Application No. 10-2009-7019065—Translation—Preliminary Rejection mailed Jan. 2011—1 page.
Korean Application No. 10-2009-7019065—Translation—Final Rejection mailed Nov. 5, 2010—2 pages.

* cited by examiner

*Primary Examiner* — Mark Rinehart
*Assistant Examiner* — Mohammad Anwar

(57) ABSTRACT

Techniques are provided for providing information to a group of nodes over a medium. Before transmitting information to the group of nodes, a source can analyze factors to determine transmission reliability of a first transmission technique and a second transmission technique and generate an analysis result. Based on the result of this analysis, the source can select one of the first transmission technique and the second transmission technique for providing the information to the group of nodes over the medium.

18 Claims, 4 Drawing Sheets

APPARATUS AND METHOD FOR MULTICASTING DATA IN A COMMUNICATION NETWORK

FIELD OF THE INVENTION

The present invention relates generally to communications and more particularly to techniques for providing information to a node or a group of nodes in communication networks such as mobile ad hoc networks.

BACKGROUND

An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Ad hoc networks can also be self-healing. Links or connections between these nodes can change dynamically in an arbitrary manner as existing nodes move within the ad hoc network, as new nodes join or enter the ad hoc network, or as existing nodes leave or exit the ad hoc network. Due to the lack of a central controller, many network-controlling functions can be distributed among the nodes such that the nodes can self-organize and reconfigure in response to topology changes.

One characteristic of the nodes in such a network is that their transmission range is usually relatively limited in comparison to other networks such as traditional cellular networks. Each node can typically directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("hop-by-hop") until the packets reach the destination node. Each intermediate node acts as a router which can intelligently route the packets (e.g., data and control information) to another node until the packets eventually reach their final destination. To assist with relaying of packets, each node may maintain routes or routing information to other nodes in the network and can utilize routing techniques to adapt to changes in the interconnectivity between nodes. The nodes can maintain this routing information by performing periodic link and topology updates. Alternatively, nodes may discover routing information only when needed, instead of utilizing updates to maintain routes.

Wireless networks may suffer from the same reliability problems as other physically unprotected media, which makes it difficult to successfully multicast data. Reliable physical broadcast mediums, such as Ethernet, do not typically have these problems. For example, in an Ethernet medium, all frames are physically broadcast on the shared medium and filtering is employed at the media access control (MAC) layer to create logical unicast and multicast services. That is, payloads can be transmitted, not just to all nodes sharing the medium, but to a specific subset of destination nodes sharing the medium. This subset may be a single node, or the entirety of nodes communicating over the medium. This is done by specifying a destination identifier in the MAC framing of the data which specifies the specific subset of destination nodes, rather than a single destination (as with unicast data). Nodes determine for themselves to which subsets they belong and, consequently, to which of these group identifiers they should listen. Specifying groups to which a node listens is sometimes called "subscribing." Upon sensing frames to a subscribed group identifier, the MAC layer of the subscribing node accepts and forwards the data payloads to the node's network stack. Other nodes not subscribed to the group identifier ignore the data.

However, in a less reliable medium, such as some wireless media, a sender cannot be certain that a single transmission of data will reach even one node, let alone multiple nodes. To compensate for this lack of reliability, the MAC layer can acknowledge unicast transmissions and retry unicast transmissions for which acknowledgements are not received. The MAC layer typically lacks a reliable broadcast service, as there is typically no managed way to negotiate and keep track of multiple acknowledgments from the multiple destinations and further because the list of destinations may change rapidly and without explicit notification. As such, MAC layer broadcasts are also considered unreliable. Thus, a simple MAC filtered multicast system built on such a broadcast medium may still not meet the transport needs for the data services it carries. Furthermore, if the broadcast medium is a multi-channel wireless medium, it is even less reliable because some of the destinations may be tuned to a different channel at any given point in time.

Notwithstanding these advances, it would be desirable to provide improved transmission techniques to a node or group of nodes sharing a medium having unreliable broadcast transmission characteristics. It would also be desirable if such techniques consume less computing resources, power and bandwidth than conventional techniques.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
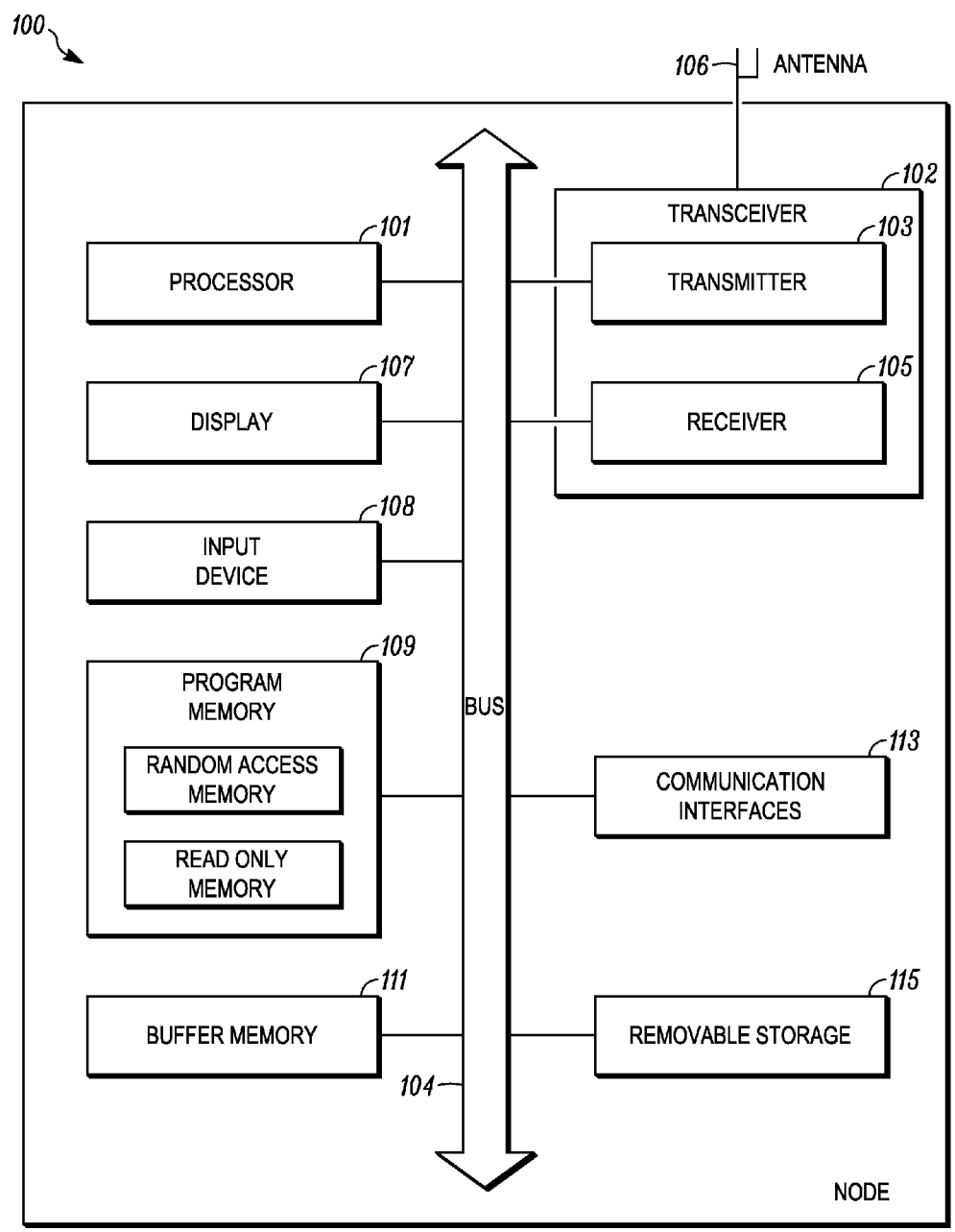
FIG. 1 is a block diagram of an exemplary node in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to providing information to a group of nodes over a media. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions described herein for providing information to a group of nodes over a media. The non-processor circuits may include, but are not limited to, a radio receiver, a radio transmitter, signal drivers, clock circuits, power source circuits, and user input devices. As such, these functions may be interpreted as steps of a method for providing information to a group of nodes over a media. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Overview

The embodiments described below relate to an apparatus and a method for providing information to a node or a group of nodes in communication networks such as mobile ad hoc networks. As used herein, a "group" may comprise an interested group of nodes. This interested group of nodes might comprise a single destination node or many destination nodes depending upon the context. In one exemplary implementation, the group can comprise a multicast group with multiple members. A source or transmitting node can use a multicast routing algorithm to determine the exact number of nodes in the group as well as the addresses of those nodes by passive sniffing of higher layer protocols that establish the group. When the source or transmitting node transmits information to the group of nodes, the transmission includes a group identifier so any members of the group can accept the transmission, while other nodes (which are not members of the group) can ignore the transmission.

In one implementation of the present invention, techniques are provided for transmitting information (e.g., data) in which a node determines the most appropriate way to provide the information to a group of nodes. Based on this determination, information can be transmitted, for example, by either repeatedly broadcasting the message or sending the message via individual unicast messages. The decision as to which of these mechanisms to use is made based on factors such as the required level of transmission reliability; inter-packet delay; throughput for the data service being used; the measured level of reliability of the transmission medium (either measured in advance or at runtime); and the number of destinations in the multicast group, and the like.

For example, in one implementation of the present invention, techniques are provided for multicasting data in which the sending node determines, at transmission time, the most efficient mechanism for transmitting information (e.g., a multicast packet) to one or more next-hop or final destinations. In some embodiments, the sending node chooses between two options: (i) transmitting one or more unicast copies of the data, in which each unicast packet is individually acknowledged, or (ii) broadcasting the data, possibly over a number of iterations, in which the broadcast packets are unacknowledged. According to various embodiments, the unicast option ensures reliability through "brute force," while the broadcast option aims for "statistical" reliability through multiple attempts that overcome the odds of failure. The decision point and the number of broadcast iterations can be tuned depending on a number of factors, including, for example, the required level of transmission reliability; inter-packet delay; throughput for the data service being used; the Quality of Service (QoS) requirement of the data being sent, the measured level of reliability of the transmission medium (either measured in advance or at runtime); the number of destinations in the multicast group, and the like.

These techniques can be used in situations, for example, where there are multiple nodes sharing a medium having unreliable broadcast transmission characteristics. An example of such a medium is a wireless medium including a multi-channel wireless medium. In these cases, simply broadcasting a packet on the medium with MAC filtering for multiple destinations may not provide acceptable delivery reliability. Multiple broadcast transmissions of a single packet may improve the delivery reliability, and are relatively efficient for distributing the packet to many destinations simultaneously, especially when the number of broadcasts required to achieve reasonable reliability is less than the number of destinations. However, in other cases, there may be as few as one destination for a multicast packet. In these cases, where the number of destinations is limited, it is more efficient to simply unicast the multicast packet to each of the subscribed destinations.

When unicasting information to each node of the group, the sending node can use a reliable acknowledgement mechanism and repeat transmission. However, as noted above, this may be inefficient for large numbers of logical destinations, as the number of transmissions increases with each destination. Because the unicast mechanism may involve retries to some nodes, the number of transmissions required to reach all of the destination nodes is some linear factor (greater than one) times the number of destination nodes. Each of these additional transmissions of the same packet causes an increase in inter-packet delay and lowers total throughput.

When broadcasting the multicast data, the sending node uses, for example, a simple MAC filtering mechanism, and repeats the broadcast several times consecutively. Each unit of information transmitted can include sequence numbers so that receiving nodes can filter out duplicate packets. By broadcasting the same data multiple times, the probability of reception at all of the destination nodes is increased with each transmission. This mechanism is typically not as reliable as using individually acknowledged transmissions, but it can be far more efficient. The number of retransmissions can be adjusted to provide an acceptable level of reliability, while limiting the delay and jitter and maintaining reasonable throughput.

According to one implementation of the present invention, the sending node can determine whether to use a repeating broadcast or a series of individual unicasts based on a set of parameters. These parameters, for example, can include: (1) the required level of transmission reliability; (2) inter-packet delay; (3) throughput for the data service; (4) the measured level of reliability of the transmission medium (either measured in advance or at runtime); (5) and the number of destinations.

Exemplary Node

FIG. 1 is a block diagram of an exemplary node 100 in accordance with some embodiments of the invention. The node 100 comprises a processor 101, a transceiver 102 including a transmitter circuitry 103 and a receiver circuitry 105, an antenna 106, a display 107, an input device 108, a program memory 109 for storing operating instructions that are executed by the processor 101, a buffer memory 111, one or more communication interfaces 113, and a removable storage unit 115. Although not shown, the node 100 also preferably includes an antenna switch, duplexer, circulator, or other highly isolative means (not shown) for intermittently providing information packets from the transmitter circuitry 103 to the antenna 106 and from the antenna 106 to the receiver circuitry 105. The node 100 is preferably an integrated unit containing at least all the elements depicted in FIG. 1, as well as any other elements necessary for the node 100 to perform its particular functions. Alternatively, the node 100 may comprise a collection of appropriately interconnected units or devices, wherein such units or devices perform functions that are equivalent to the functions performed by the elements of the node 100. For example, the node 100 may comprise a laptop computer and a wireless LAN (local area network) card.

The processor 101 preferably includes one or more microprocessors, microcontrollers, DSPs (digital signal processors), state machines, logic circuitry, or any other device or devices that process information based on operational or programming instructions. Such operational or programming instructions are preferably stored in the program memory 109. The program memory 109 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. One of ordinary skill in the art will recognize that when the processor 101 has one or more of its functions performed by a state machine or logic circuitry, the memory 109 containing the corresponding operational instructions may be embedded within the state machine or logic circuitry. The operations performed by the processor 101 and the rest of the node 100 are described in detail below. The processor 101 in each node 101 also includes the appropriate hardware and software to perform Internet Protocol (IP) and Address Resolution Protocol (ARP). The appropriate hardware and software to perform transmission control protocol (TCP) and user datagram protocol (UDP) may also be included.

The transmitter circuitry 103 and the receiver circuitry 105 enable the node 100 to communicate information packets to and acquire information packets from the other nodes. In this regard, the transmitter circuitry 103 and the receiver circuitry 105 include circuitry to enable digital or analog transmissions over a wireless communication channel. The transmitter circuitry 103 and the receiver circuitry 105 are designed to operate over both a cellular air interface (e.g., Global System for Mobile communication (GSM), Code Division Multiple Access (CDMA), Wide-band CDMA (WCDMA), Universal Mobile Telecommunications System (UMTS), and the like) and an ad hoc networking air interface (e.g., BLUETOOTH, 802.11 WLAN, 802.16 WiMax, and the like).

The implementations of the transmitter circuitry 103 and the receiver circuitry 105 depend on the implementation of the node 100. For example, the transmitter circuitry 103 and the receiver circuitry 105 can be implemented as an appropriate wireless modem, or as conventional transmitting and receiving components of two-way wireless communication devices. In the event that the transmitter circuitry 103 and the receiver circuitry 105 are implemented as a wireless modem, the modem can be internal to the node 100 or insertable into the node 100 (e.g., embodied in a wireless a radio frequency (RF) modem implemented on a Personal Computer Memory Card International Association (PCMCIA) card). For a wireless communication device, the transmitter circuitry 103 and the receiver circuitry 105 are preferably implemented as part of the wireless device hardware and software architecture in accordance with known techniques. Most, if not all, of the functions of the transmitter circuitry 103 and/or the receiver circuitry 105 may be implemented in a processor, such as the processor 101. However, the processor 101, the transmitter circuitry 103, and the receiver circuitry 105 have been artificially partitioned herein to facilitate a better understanding.

The receiver circuitry 105 is capable of receiving RF signals from at least one bandwidth and optionally more bandwidths, if the communications with the proximate device are in a frequency band other than that of the network communications. The receiver circuitry 105 may optionally comprise a first receiver and a second receiver, or one receiver capable of receiving in two or more bandwidths. The receiver 105, depending on the mode of operation, may be tuned to receive, for example, Public Land Mobile Radio System (PLMRS), Advanced Mobile Phone Service (AMPS), GSM, CDMA, UMTS, WCDMA, Bluetooth, or WLAN (e.g., IEEE 802.11) communication signals. The transceiver 102 includes at least one set of transmitter circuitry 103. The at least one transmitter 103 may be capable of transmitting to multiple devices potentially on multiple frequency bands. As with the receiver 105, dual transmitters 103 may optionally be employed where one transmitter is for the transmission to a proximate node or direct link establishment to WLANs and the other transmitter is for transmission to a cellular base station.

The antenna 106 comprises any known or developed structure for radiating and receiving electromagnetic energy in the frequency range containing the wireless carrier frequencies.

The buffer memory 111 may be any form of volatile memory, such as RAM, and is used for temporarily storing received information packets in accordance with the present invention.

When the node 100 is constructed to receive video information from a video source, the node 100 preferably further includes a video decoder capable of decoding the current Moving Picture Experts Group (MPEG) standard or some other video decoding standard. When the node 100 is further capable of transmitting video information, the node 100 preferably further includes a video encoder capable of encoding the video data into at least one of the foregoing video standards. Such a video encoder and video decoder are preferably implemented as part of the processor 101.

The node 100 can determine the most appropriate way to provide information which it transmits to group of nodes (e.g., a multicast group) over an unreliable, broadcast-capable media. A broadcast-capable media can be any media, such as a wireless media, which allows any source or transmitting node 100 in a network to transmit to other destination nodes in the same logical network and within an operable range of the source or transmitting node. The information can be any data that might need to be transmitted to more than one destination and for which the node 100 may not know the address(es) of the destination(s).

The processor 101 can analyze feedback factors (FFs) to determine transmission reliability of a first transmission technique ($1^{st}$ TT) and to determine transmission reliability of a second transmission technique ($2^{nd}$ TT) for providing the information to the group of nodes over the unreliable media. The FFs are learned by measurement of feedback information from other nodes in the network. The feedback information can be transmission feedback information (e.g., Acknowledgment (ACK) messages to let the transmitter know whether packets are being received by a given destination) and other radio-provided parameters (e.g., Receive Signal Strength Indication (RSSI) or Signal Quality Error (SQE)). The FFs can include, for example, at least one or more of: number of nodes in the group, a required level of transmission reliability, inter-packet delay, throughput for the service being used, reliability of the transmission medium (measured in advance or at runtime), and the like. Any number of these FFs can be used by the processor to determine transmission reliability of the $1^{st}$ TT and the $2^{nd}$ TT for providing the information to the group of nodes over the unreliable media. Moreover, depending on the implementation, the processor 101 can use different combinations of the FFs to make this determination.

For instance, in one implementation, the FF may only include the number of nodes in the group of nodes (e.g., multicast group). In another implementation, the FFs can comprise any number of factors (or different combinations of those factors). These factors can include, for example, the number of nodes in the group of nodes (e.g., multicast group), the required level of transmission reliability, the inter-packet delay, throughput for the service being used and reliability of the transmission medium to the group of destination nodes or individually to each destination node in the group (measured in advance or at runtime).

The "required level of transmission reliability" can be based on Quality-of-Service (QoS) parameters which serve to establish transport requirements (e.g., reliability/throughput/delay/jitter bar) for a particular packet. The QoS parameters can provide information regarding delay requirements or throughput requirements for a given transmission of information. For instance, an indication in the packet's QoS tag which indicates a low-latency or low-jitter requirement can be used by the processor to reduce the number of repeated broadcast transmissions as after some few transmissions the packet will be obsolete. On the other hand, if the tag indicates an important message (e.g. a data packet coming from a fire chief to order an evacuation, the processor will increase the number of transmissions. If the QoS tag on the particular packet indicates a need for reliability, it might influence the decision of which mechanism to pick (or in the case of repeated broadcasts increase the number of transmissions). By contrast, if a given packet makes no particular demand of reliability or latency, then the most efficient mechanism to meet some minimum acceptable level of reliability might be chosen. The processor 101 can analyze the FFs and determine which TT most efficiently meets the requirement for a particular packet. The next packet transmitted may have a different QoS requirement and, therefore, it might be better to use a different TT than used for the particular packet.

The "throughput" for the service being used works orthogonally to QoS parameters. Both transmission mechanisms (unicasts, groupcasts) can achieve any arbitrary level of reliability to an arbitrary number of group members given enough transmission attempts at a low enough data rate. However, those multiple attempts at low rates cost time and decrease effective throughput.

For a given reliability requirement (e.g., "90% reception with a 95% confidence interval to 10 member nodes"), a number of attempts and data rate required to use each mechanism can be estimated. For example, if required reliability using 4 unacknowledged group transmissions at 2 Mbps encoding can be estimated, it could also be estimated that the same reliability requirement could be met with 12 unicast attempts at an average of 10 Mbps encoding. In this case, the unicast mechanism probably offers us a higher resultant throughput because 12 copies at 10 Mbps is faster than 4 copies at 2 Mbps.

The processor 101 can analyze the number of nodes in the group of nodes (e.g., multicast group) and/or the required level of transmission reliability and/or the inter-packet delay, and/or throughput for the service being used to determine the transmission reliability of using either the $1^{st}$ TT (e.g., repeatedly broadcasting/multicasting the information to the nodes of the multicast group over the media) or a $2^{nd}$ (e.g., unicasting the information over the media to each node of the group).

Based on the analysis result, the processor 101 selects one of the $1^{st}$ TT and the $2^{nd}$ TT. The $1^{st}$ TT may comprise, for example, repeatedly broadcasting/multicasting the information over the media to the group of nodes. The $2^{nd}$ TT may comprise, for example, unicasting the information over the media to each node 100 of the group. Once the processor 101 selects one of the $1^{st}$ TT and the $2^{nd}$ TT, the transmitter 103 of node 100 can transmit the information using the one of the 1st TT and the 2nd TT which is selected.

For example, if the processor 101 selects the $1^{st}$ TT, the processor 101 can instruct the transmitter 103 to repeatedly broadcast/multicast the information over the media to the group of nodes. In addition, the processor 101 can determine, based on the analysis result, a number of times to repeatedly broadcast/multicast the information to help ensure reliable transmission to the group of nodes. The processor 101 can include sequence numbers in each packet to be transmitted. This way, the nodes of the group which receive the packets via the multiple broadcasts of the data can use the sequence numbers to identify when duplicate copies of the same data are received and can then discard any duplicate packets. The transmitter 103 can then repeatedly broadcast/multicast the information the number of times via multicast messages to the group of nodes.

By contrast, if the processor 101 selects the $2^{nd}$ TT, the processor 101 can instruct the transmitter 103 to unicast the information over the media to each node. For example, the transmitter 103 can transmit the information via individual unicast messages to each node. These unicast messages can also be accompanied by an acknowledgment request. The processor 101 can then wait for an amount of time to receive an acknowledgement message (ACK) from each of the nodes confirming receipt of the information. If the node 100 does not receive an ACK from a particular node in the amount of time, then the node 100 can retransmit the information via another individual unicast message to that particular node.

Exemplary Ad Hoc Network

To help illustrate how these concepts might be applied in an exemplary communication network and the configuration of that communication network, an example will now be described with reference to FIGS. 2 and 3.

Figure 2:
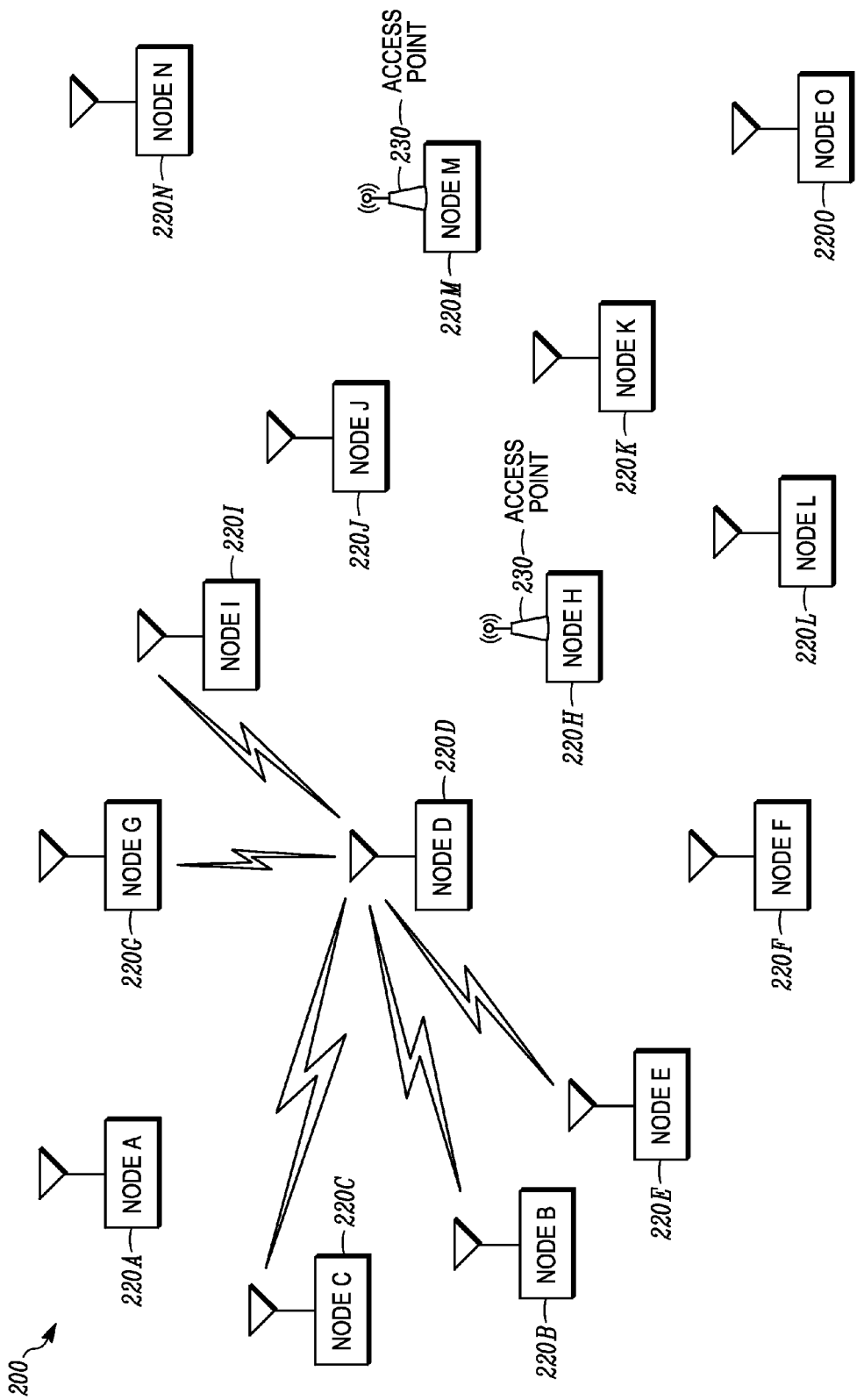
FIG. 2 is a block diagram of an exemplary ad hoc communication network.

FIG. 2 is a block diagram of an exemplary ad hoc communication network 200 at a first time instant.

The ad hoc communication network 200 can be created between a plurality of nodes 220A-220O each having wireless repeater and routing capability, and optionally wired Access Points (APs) 230. Clients can move seamlessly between infrastructure-based networks and client-based peer-to-peer networks. It will be appreciated by those of ordinary skill in the art that while the ad hoc network 200 in FIG. 2 is shown as operating in an infrastructured mode (e.g., including APs), the ad hoc network 200 of FIG. 2 does not require any network infrastructure to be present. Rather, the nodes 220A-220O typically support simultaneous operation in both infrastructureless mode and infrastructured mode.

In the ad hoc network 200, communications to or from nodes 220A-220O can "hop" through each other to reach other nodes 220A-220O in the network. The nodes 220A-220O can generally be wireless devices capable of receiving packetized audio, video and/or data information. Some of the components in an exemplary node, such as an appropriate processor, transmitter, receiver and antenna, are described above in FIG. 1. The nodes 220A-220O can communicate information packets over wireless carrier frequencies, each of which includes one or more wireless communication channels.

In infrastructured mode, the APs 230 is typically coupled to a wired network (not shown) and can provide one or more sources of audio, video and/or data information. The APs 230 may be a cellular base station, a wireless access point that complies with the IEEE 802.11 Standard or other wireless local area network (WLAN) Standards, a Bluetooth access point, or the like. The nodes (e.g., node H 220H) in close proximity to the AP 230 can receive transmissions from other nodes utilizing the ad hoc air interface and relay these transmissions to infrastructure equipment via uplink communication signal utilizing, for example, a cellular, Bluetooth or WLAN air interface. Similarly, nodes (e.g., node H 220H) in close proximity to the AP 230 can receive downlink communications over the cellular, Bluetooth or WLAN air interface and transmit uplink communications to another node via the ad hoc air interface.

Although not shown in FIG. 2, it will also be appreciated by those of ordinary skill in the art that the nodes 220A-220O, can also communicate information packets with a cellular-based network (not shown) over wireless carrier frequencies, each of which includes one or more wireless communication channels depending on the multiple access scheme utilized in the cellular-based network. Examples of multiple access schemes which can be used in the network can include any one or more of time division multiple access (TDMA), direct sequence or frequency hopping code division multiple access (CDMA), frequency division multiple access (FDMA), orthogonal frequency division multiplexing (OFDM), opportunity division multiple access (ODMA), a combination of any of the foregoing multiple access technologies, a multiple access technology in which portions of the frequency spectrum to be used are determined by local signal quality measurements and in which multiple portions of the frequency spectrum may be used simultaneously, or any other multiple access or multiplexing methodology or combination thereof.

Each node 220A-220O can advertise its presence to other nodes by periodically broadcasting an advertisement message. In turn, each node can identify its neighbor nodes, and maintain a neighbor list of nodes in proximity to that node. As used herein, a "neighbor node" is a node which is one hop away from the node such that the nodes may communicate with each other. A particular node's neighbor list changes dynamically as the topology of the network changes. At the particular instant in time shown in FIG. 2, node D 220D has six neighbor nodes—node B 220B, node C 220C, node E 220E, node G 220G, node H 220H, and node I 220I.

Figure 3:
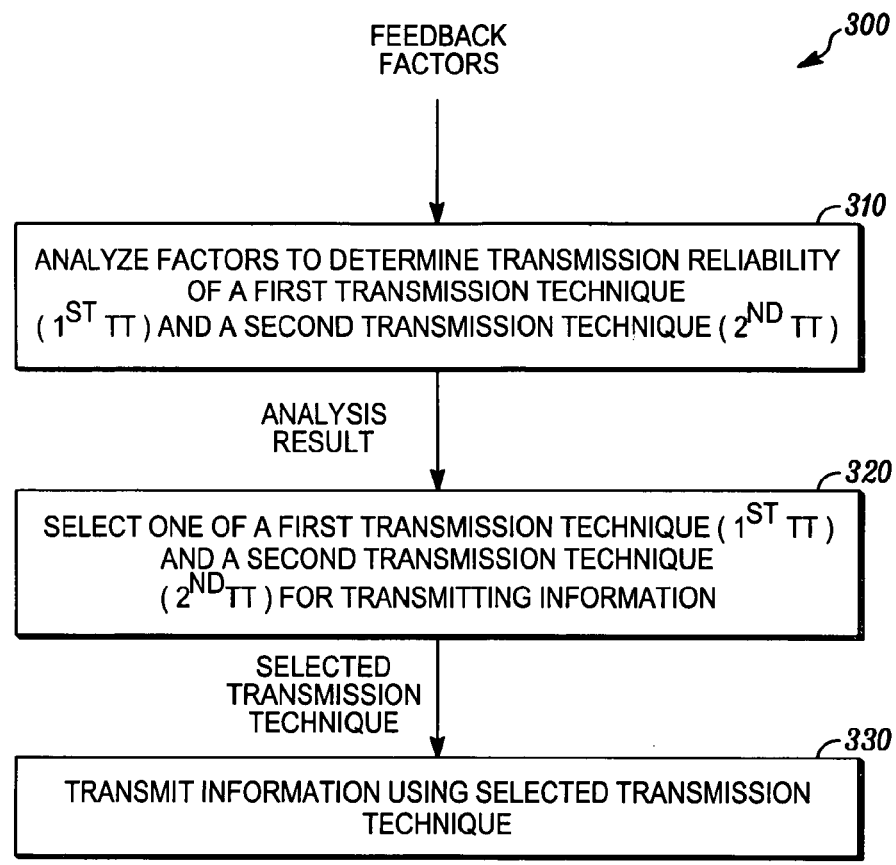
FIG. 3 is a flowchart showing an exemplary method for providing information to a group of nodes over a media in a network in accordance with some embodiments of the invention.

FIG. 3 is a flowchart showing an exemplary method 300 for providing information to a group of nodes over a media in a network in accordance with some embodiments of the invention. To illustrate one possible application of this method 300 to a particular network configuration, the following non-limiting example will be described with reference to FIG. 2 in which the network is a wireless ad hoc network 200, the media is assumed to be a wireless media, the transmitting/sending node is node 220D, and the group of nodes 220 B, C, D, E, G, I comprise a "multicast" group. It will be appreciated that this general method could also be applied in other types of networks. Moreover, the type of "group" is not necessarily limited to multicast type groups as discussed in this specific implementation, but could also be applied to other types of broadcast groups.

At step 310, the node 220D analyzes FFs to determine transmission reliability of a 1st TT for providing information to the nodes 220 B, C, E, G, I over the wireless media, and to determine transmission reliability of a 2nd TT for providing the information to the nodes 220 B, C, E, G, I over the wireless media. As noted above, the FFs can be learned by measurement of feedback information from other nodes in the network 200. The FFs can include, for example, at least one or more of: number of nodes in the group, a required level of transmission reliability, inter-packet delay, throughput for the service being used, reliability of the transmission medium (measured in advance or at runtime), and the like. Any number of these FFs can be used by the processor to determine transmission reliability of the $1^{st}$ TT over the unreliable media and to determine transmission reliability of the $2^{nd}$ TT for providing the information to the group of nodes over the unreliable media. Moreover, the node 220D can use different combinations of the FFs to make this determination.

The $1^{st}$ TT may comprise, for example, repeatedly broadcasting/multicasting the information over the media to the nodes of the multicast group. For example, the $1^{st}$ TT may comprise sending one or more copies of the data to a "group" address which is then received by all interested parties at the same time, but which typically lacks any per-node acknowledgement mechanisms. The $2^{nd}$ TT may comprise, for example, unicasting the information over the media to each node 220 B, C, E, G, I of the multicast group. For example, the $1^{st}$ TT may comprise sending one copy of the data per each member of the group, each addressed to a different and specific member, with acknowledgment of each transmission and retries to individual members as needed.

As also noted above, the node 220D can analyze the number of nodes 220 B, C, E, G, I in the multicast group, and/or the required level of transmission reliability and/or the inter-packet delay, and/or throughput for the service being used. Based on this analysis, the node 220D can determine the transmission reliability of either the $1^{st}$ TT (e.g., repeatedly broadcasting/multicasting the information to the nodes 220

B, C, E, G, I of the multicast group over the media), or the $2^{nd}$ TT (e.g., unicasting the information over the media to each node 220 B, C, E, G, I of the group, and generate an analysis result.

At step 320, the node 220D selects one of the $1^{st}$ TT and the $2^{nd}$ TT based on the analysis result.

Once the node 220D selects one of the $1^{st}$ TT and the $2^{nd}$ TT, then at step 330, the node 220D can transmit the information using the one of the 1st TT and the 2nd TT which is selected at step 320.

For example, if the node 220D selects the $1^{st}$ TT, the node 220D can instruct the transmitter 103 to repeatedly broadcast/multicast the information over the media to the group of nodes 220 B, C, E, G, I. In addition, the node 220D can determine, based on the analysis result, a number of times to repeatedly broadcast/multicast the information over the media to ensure reliable transmission to the group of nodes 220 B, C, E, G, I. The node 220D can then repeatedly broadcast/multicast the information the number of times via multicast messages to the group of nodes 220 B, C, E, G, I. The node 220D can include sequence numbers in each packet to be transmitted. This way, the nodes 220 B, C, E, G, I of the group which receive the packets via the multiple broadcasts of the data can use the sequence numbers to understand when duplicate copies of the same data are received and can discard any duplicate packets.

By contrast, if the node 220D selects the $2^{nd}$ TT, the node 220D can instruct the transmitter 103 to unicast the information over the media to each of the nodes 220 B, C, E, G, I via individual unicast messages to each of the nodes 220 B, C, E, G, I. These unicast messages can also be accompanied by an acknowledgment request. The node 220D can then wait for an amount of time to receive an acknowledgement message (ACK) from each of the nodes 220 B, C, E, G, I confirming receipt of the information. If the node 100 does not receive an ACK from a particular node, then the node 100 can retransmit the information via another individual unicast message to each of the nodes from which an acknowledgment message was not received in the amount of time.

Examples of how a sending/transmitting node might analyze FFs to determine an appropriate transmission technique will now be described below with reference to FIG. 4.

Figure 4:
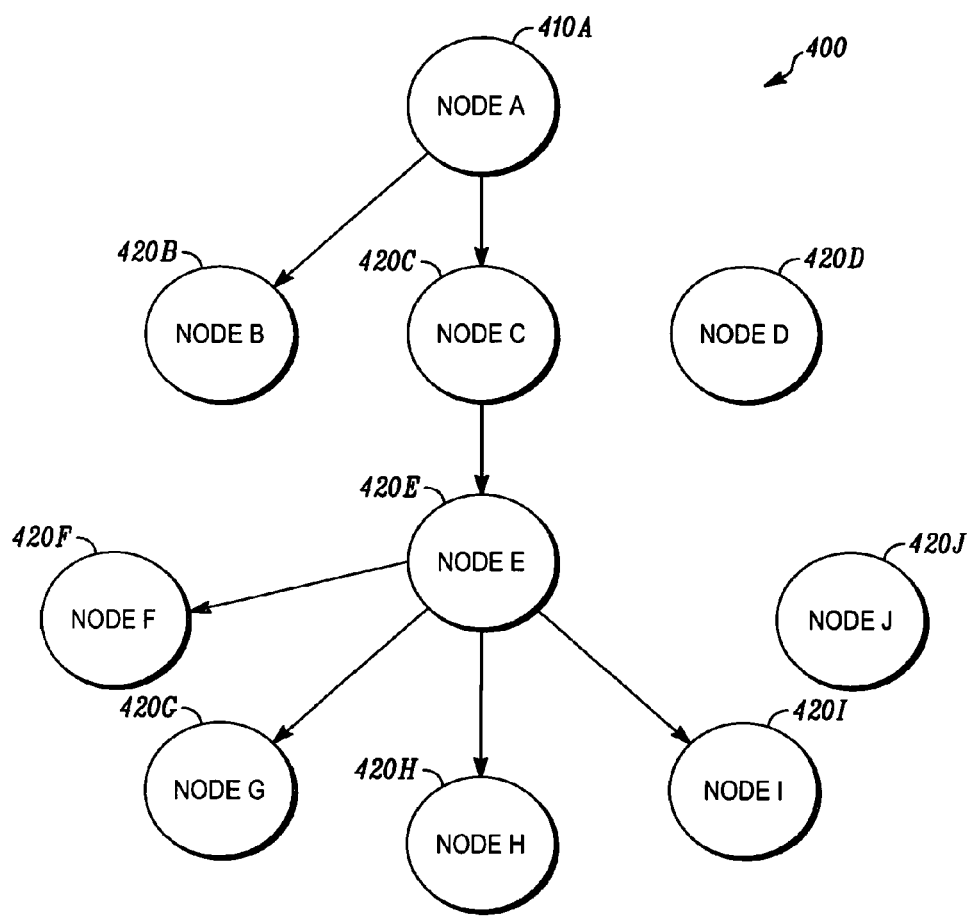
FIG. 4 is an exemplary information flow diagram which illustrates how a sending/transmitting node might determine an appropriate transmission technique (TT) for providing information to a group of nodes over a media.

FIG. 4 is an exemplary information flow diagram 400 which illustrates how a sending/transmitting node 410A might analyze FFs to determine an appropriate transmission technique for providing information to a group of nodes 420 B, F, G, H, I over a media. In this example, it is assumed that a sending node 410A on the LAN sends a multicast message to a multicast group that has five subscribers, nodes 420 B, F, G, H, I. It will be assumed that the communication parameters are the same for every node and are required transmission reliability of 95%, measured probability of success per node per broadcast attempt of 70% and measured probability of success per unicast attempt=98%.

In this example, the probability of a broadcast being successfully received by any given node is lower than the probability of a unicast being successfully received and acknowledged because the broadcast packet does not have the benefit of intelligent neighbor monitoring to determine that the neighbors are ready to receive a packet.

From the sending node 410A, there are two logical destinations for the packet—node 420B and node 420C. Node 420C is not a subscriber to the group 420 B, F, G, H, I, but has nodes 420 F, G, H, I downstream of it that are subscribers and is therefore a required destination. Node 420D is an uninterested bystander. Node 410A first retrieves the communication parameters from a memory. Based on those communication parameters, it determines the success probability for both a unicast and a broadcast transmission. For the unicast method, node 410A determines that the required logical destinations could be reached by making two acknowledged unicast transmission attempts, one to each of the destinations, and with a 96% probability of success in those two attempts. (Note that if retries are allowed, there would be 100% transmission reliability to both destinations, since unicast transmissions are acknowledged and can be retried on demand, but this does require more attempts.) In the broadcast option, node 410A determines, based on the communication parameters, that it would have to broadcast the packet three times in order to reach both nodes 420B and 420C with the required 95% probability. Two broadcast attempts would only reach 91% reliability (9% probability of failure), which is insufficient to meet the required reliability. Thus, node 410A determines that the probability of success in a unicast transmission is higher than the broadcast transmission. Thus, node 410A unicasts the packet to both node 420B and node 420C. Though it is in transmission range of node 410A, node 420D is not disturbed because node 410A only unicasts the packet to nodes 420B and 420C.

Node 420C receives the packet, and retrieves the communication parameters from a memory. Based on the communication parameters, it determines that the probability of reaching node 420E with a single unicast outweighs the number of broadcasts needed to reach 95% reliability. Node 420C's decision is relatively easy given that it has to send the packet to only one logical destination 420E.

Node 420E receives the packet and retrieves the communication parameters from a memory. Based on the parameters, node 420E determines that it would take at least four unicast transmissions (and possibly more) to reach each of the destinations (nodes 420 F, G, H, and I), but that three broadcast transmissions would be sufficient to reach all four nodes with 97.3% reliability. In this instance, node 420E determines that it would be best to broadcast the packet because it requires fewer transmission attempts to reach the required level of reliability than by unicasting. Nodes 420 F, G, H, and I may receive duplicates of the packet, but would be able to discard the duplicates because they have the same sequence number. Node 420J would be exposed to the broadcast frames, too, but would filter these out at the MAC layer because it was not subscribed to the appropriate multicast group 420 B, F, G, H, I.

In the foregoing specification, specific embodiments of the present invention have been described. However, one of ordinary skill in the art appreciates that various modifications and changes can be made without departing from the scope of the present invention as set forth in the claims below.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed:

1. A method of communicating information among a group of nodes of a wireless network, the method comprising:
   selecting a transmission technique by a node of the group of nodes, wherein the selecting comprises determining transmission reliability of a first transmission technique and a second transmission technique, and selecting one of the first transmission technique and the second transmission technique that meets a required level of transmission reliability, wherein the first transmission technique comprises repeatedly broadcasting/multicasting the information to the group of nodes and the second transmission technique comprises unicasting the information to each node of the group;

determining, by the node, a number of times to repeatedly broadcast/multicast the information when the first transmission technique is selected;

transmitting, by the node, the information using the selected transmission technique;

receiving the information at a plurality of other nodes of the group of nodes; and repeating the selecting, transmitting, receiving, and determining, by each of the plurality of other nodes that is an intermediate node.

2. A method according to claim 1, wherein the selecting further comprises:
analyzing a number of nodes in the group to determine the transmission reliability of the first transmission technique and the second transmission technique.

3. A method according to claim 1, wherein the selecting further comprises:
analyzing a number of nodes in the group and a required level of transmission reliability to determine the transmission reliability of the first transmission technique and the second transmission technique.

4. A method according to claim 1, wherein the selecting further comprises:
analyzing a number of nodes in the group, a required level of transmission reliability and an inter-packet delay, to determine the transmission reliability of the first transmission technique and the second transmission technique.

5. A method according to claim 1, wherein the selecting further comprises:
analyzing a number of nodes in the group, a required level of transmission reliability, an inter-packet delay, a throughput for the service being used, to determine the transmission reliability of the first transmission technique and the second transmission technique.

6. A method according to claim 1, wherein the selecting further comprises:
analyzing a number of nodes in the group, a required level of transmission reliability, an inter-packet delay, a throughput for the service being used, a reliability of the medium to determine the transmission reliability of the first transmission technique and the second transmission technique.

7. A method according to claim 1,
wherein the determining the number of times to repeatedly broadcast/multicast comprises:
determining, based on an analysis result, the number of times to repeatedly broadcast/multicast the information to ensure reliable transmission to the group of nodes; and wherein the transmitting the information comprises:
multicasting the information via multicast messages to the group of nodes the number of times.

8. A method according to claim 7, wherein the first transmission technique further comprises:
including a sequence number in the information;
receiving the information by the plurality of other nodes of the group of nodes;
determining by the receiving node, based on the sequence number, whether the information is duplicate; and
discarding the information if determined that the information is duplicated.

9. A method according to claim 1,
wherein the transmitting the information, comprises:
transmitting the information via individual unicast messages to each node of the group; and
waiting an amount of time to receive an acknowledgement message from each of the nodes confirming receipt of the information;
retransmitting the information via the individual unicast messages to each node of the group from which the acknowledgment message was not received in the amount of time.

10. A wireless network comprising a group of nodes communicating over a medium, the group of nodes comprising:
a first node configured to:
select a transmission technique by determining transmission reliability of a first transmission technique and a second transmission technique, for providing information to the group of nodes over the medium, wherein the first transmission technique comprises repeatedly broadcasting/multicasting the information to the group of nodes and the second transmission technique comprises unicasting the information to each node of the group;
determine a number of times to repeatedly broadcast/multicast the information when the first transmission technique is selected; and
transmit the information using the selected transmission technique over the medium; and
a plurality of other nodes, wherein each of the plurality of other nodes is configured to:
receive the information over the medium; and
repeat the selection of a transmission technique, and the transmission of the information, by each of the plurality of other nodes that is an intermediate node.

11. A wireless network according to claim 10, wherein the selecting further comprises analyzing a number of nodes in the group, and determining the transmission reliability of the first transmission technique and the second transmission technique.

12. A wireless network according to claim 10, wherein the selecting further comprises analyzing a number of nodes in the group and a required level of transmission reliability to determine the transmission reliability of the first transmission technique and the second transmission technique.

13. A wireless network according to claim 10, wherein the selecting further comprises analyzing a number of nodes in the group, a required level of transmission reliability and an inter-packet delay, to determine the transmission reliability of the first transmission technique and the second transmission technique.

14. A wireless network according to claim 10, wherein the selecting further comprises analyzing a number of nodes in the group, a required level of transmission reliability, an inter-packet delay, a throughput for the service being used, to determine the transmission reliability of the first transmission technique and the second transmission technique.

15. A wireless network according to claim 10, wherein the selecting further comprises analyzing a number of nodes in the group, a required level of transmission reliability, an inter-packet delay, a throughput for the service being used, and a reliability of the medium to determine the transmission reliability of the first transmission technique and the second transmission technique.

16. A wireless network according to claim 10,
wherein the analyzing comprises determining, based on an analysis result, the number of times to repeatedly broadcast/multicast the information over the medium to ensure reliable transmission to the group of nodes; and
wherein the transmission further comprises repeatedly broadcasting/multicasting the information the number of times via multicast messages to the group of nodes.

17. A wireless network according to claim 10,
wherein the transmission comprises transmitting the information via individual unicast messages to each node, and wherein the node waits for an amount of time to receive an acknowledgement message from each of the nodes confirming receipt of the information, and retransmits the information via the individual unicast messages to each of the nodes from which the acknowledgment message was not received in the amount of time.

18. A method of communicating information from a sending node to a plurality of nodes of a subscriber group in a wireless network, the method comprising:

selecting a transmission technique, by the sending node, wherein the selecting comprises determining transmission reliability of a first transmission technique and a second transmission technique, and selecting one of the first transmission technique and the second transmission technique that meets a required level of transmission reliability, wherein the first transmission technique comprises repeatedly broadcasting/multicasting the information to the group of nodes and the second transmission technique comprises unicasting the information to each node of the group;

determining, by the sending node, a number of times to repeatedly broadcast/multicast the information, when the first transmission technique is selected;

transmitting, by the sending node, the information using the selected transmission technique;

receiving the information, transmitted by the sending node, at a plurality of other nodes; and repeating the selecting, transmitting, receiving, and determining, by each of the plurality of nodes that belongs to the subscriber group and is an intermediate node.

* * * * *